(12) United States Patent
Miura

(10) Patent No.: US 9,160,875 B2
(45) Date of Patent: Oct. 13, 2015

(54) IMAGE FORMING APPARATUS USING TECHNIQUE FOR CONTROLLING POWER SUPPLY

(71) Applicant: CANON KABUSHIKI KAISHA, Tokyo (JP)

(72) Inventor: Shigeo Miura, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/578,783

(22) Filed: Dec. 22, 2014

(65) Prior Publication Data

US 2015/0181066 A1    Jun. 25, 2015

(30) Foreign Application Priority Data

Dec. 25, 2013 (JP) ................... 2013-267299

(51) Int. Cl.
| | |
|---|---|
| G06K 15/00 | (2006.01) |
| H04N 1/00 | (2006.01) |
| H04N 7/088 | (2006.01) |
| G06F 1/26 | (2006.01) |
| G03G 15/00 | (2006.01) |
| H01R 13/66 | (2006.01) |
| H02M 1/42 | (2007.01) |
| H02M 3/156 | (2006.01) |

(52) U.S. Cl.
CPC ....... *H04N 1/00888* (2013.01); *H04N 1/00901* (2013.01); *H04N 1/00904* (2013.01); *G03G 15/5004* (2013.01); *G06F 1/26* (2013.01); *G06F 1/266* (2013.01); *H01R 13/6675* (2013.01); *H02M 1/4258* (2013.01); *H02M 3/156* (2013.01); *H04N 7/088* (2013.01)

(58) Field of Classification Search
None
See application file for complete search history.

(56) References Cited

U.S. PATENT DOCUMENTS

| | | | | |
|---|---|---|---|---|
| 5,270,657 A | * | 12/1993 | Wirth et al. | 324/322 |
| 2004/0149740 A1 | * | 8/2004 | Kishi et al. | 219/660 |
| 2007/0071479 A1 | * | 3/2007 | Semma et al. | 399/88 |
| 2007/0170898 A1 | * | 7/2007 | Ogawa | 323/234 |
| 2012/0062922 A1 | * | 3/2012 | Nozawa | 358/1.13 |

FOREIGN PATENT DOCUMENTS

JP    10-304134 A    11/1998

* cited by examiner

*Primary Examiner* — Miya J Cato
(74) *Attorney, Agent, or Firm* — Rossi, Kimms & McDowell LLP

(57) ABSTRACT

An image forming apparatus that ensures high-quality power supply to an AFE (analog front-end) and reduces the amount of power consumed by the AFE in sleep mode. The AFE, which converts an analog signal into a digital signal, and another circuit different from the AFE are incorporated in an SOC (system-on-a-chip). A switch circuit switches power to the AFE between first DC power supply from a 5-V/3.3-V_LDO and second DC power from a 24-V/3.3-V_DC-DC converter. When the AFE is in use, the switch circuit is controlled such that the first DC power is supplied from the 5-V/3.3-V_LDO to the AFE, and when the AFE is not in use, the switch circuit is controlled such that the second DC power is supplied from the 24-V/3.3-V_DC-DC converter to the AFE.

6 Claims, 8 Drawing Sheets

24-V/3.3-V DC-DC CONVERTER

24-V/3.3-V DC-DC CONVERTER

24-V/3.3-V DC-DC CONVERTER

IMAGE FORMING APPARATUS USING TECHNIQUE FOR CONTROLLING POWER SUPPLY

BACKGROUND OF THE INVENTION

1. Field of the Invention

The present invention relates to an image forming apparatus, and in particular to a technique for controlling power supply to an integrated circuit constituting an image forming apparatus.

2. Description of the Related Art

In recent years, controller systems that use an integrated circuit called a system-on-a-chip (SOC) to control overall operation of an image forming apparatus have become widespread. As the SOC, one which incorporates an analog front-end (AFE) that converts an analog image signal into a digital signal is becoming common. The AFE has a filter circuit that removes noise from a read analog signal, an amplification circuit that amplifies an analog signal, and an A/D converter that converts an analog signal into a digital signal.

Power to a reading unit, which is comprised of an AFE and a reading sensor such as a CIS or a CCD, is supplied from an accurate series path regulator (see, for example, Japanese Laid-Open Patent Publication (Kokai) No. H10-304134). A DC-DC converter is a power supply that has higher power conversion efficiency than that of the series path type regulator, but use of the DC-DC converter may cause ripple noise in output from the DC-DC converter due to the effect of switching. For example, when power is supplied from the DC-DC converter to the reading unit, noise may affect an image in, for example, a mode where a low-intensity halftone image is read, causing image quality to deteriorate.

An AFE and a reading sensor are usually connected together using a long cable since they are placed away from each other. Thus, there is concern that the ripple noise could make radiation noise worse. Further, in an image forming apparatus that carries out facsimile communications through an analog public line, undesired noise may propagate to the analog public line. On the other hand, from the standpoint of saving energy for an image forming apparatus, a DC-DC converter is more advantageous than a series path regulator.

An SOC with a built-in AFE is subjected to the constraint that power to the AFE cannot be turned off while an image forming apparatus is in energy-saving mode (sleep mode). On the other hand, the SOC has an IO circuit or the like as well as the AFE, and hence, for example, an interrupt signal for returning from a sleep state is input to the SOC. To make this interrupt signal valid, it is necessary to supply power to the IO circuit in the SOC when the image forming apparatus is in sleep mode. When power to the AFE is turned off in sleep mode, a potential difference occurs between a circuit to which power is being supplied and the AFE. As a result, current flows from the circuit to which power is being supplied to the AFE to which no power is being supplied, and this causes a latch-up phenomenon or the like and may damage a device.

As described above, when an image forming apparatus is in sleep mode, power must be supplied to an AFE. Also, from the standpoint of ensuring image quality, power to an AFE needs to be supplied from a series path regulator. The series path regulator lowers voltage using a transistor or a field-effect transistor (FET) and obtains desired output voltage with respect to input voltage.

For this reason, the series path regulator does not perform switching as distinct from a DC-DC converter, and hence it is less affected by noise. On the other hand, the series path regulator basically matches output voltage to desired output voltage by consuming power with a transistor or an FET and is thus inefficient in power conversion and not suitable for energy saving.

SUMMARY OF THE INVENTION

The present invention provides an image forming apparatus that ensures high-quality power supply to an AFE and reduces power consumed by the AFE in sleep mode.

Accordingly, a first aspect of the present invention provides an image forming apparatus comprising a conversion circuit configured to convert an analog signal into a digital signal, a first power supply configured to supply first DC power to the conversion circuit, and a second power supply configured to supply second DC power to the conversion circuit using a method different from a method used by the first power supply, an integrated circuit in which the conversion circuit and other circuits different from the conversion circuit are incorporated, a switching circuit configured to switch power to the conversion circuit between the first power and the second power, and a control unit configured to, when the conversion circuit is in use, control the switching circuit such that the first DC power is supplied from the first power supply to the conversion circuit, and when the conversion circuit is not in use, control the switching circuit such that the second DC power is supplied from the second power supply to the conversion circuit.

According to the present invention, power that is to be supplied to an AFE incorporated in an integrated circuit (SOC) is supplied from a series path regulator with low noise when the AFE is in use. When the AFE is not in use, power to the AFE is switched to power from a DC-DC converter with high power-supply efficiency. As a result, noise to the AFE is suppressed, and high-quality power supply to the AFE is ensured, while power consumption in sleep mode, non-image reading mode, or the like where the AFE is not in use is reduced to achieve an energy-saving effect.

Further features of the present invention will become apparent from the following description of exemplary embodiments (with reference to the attached drawings).

DESCRIPTION OF THE EMBODIMENTS

The present invention will now be described with reference to the drawings showing an embodiment thereof.

Figure 1:
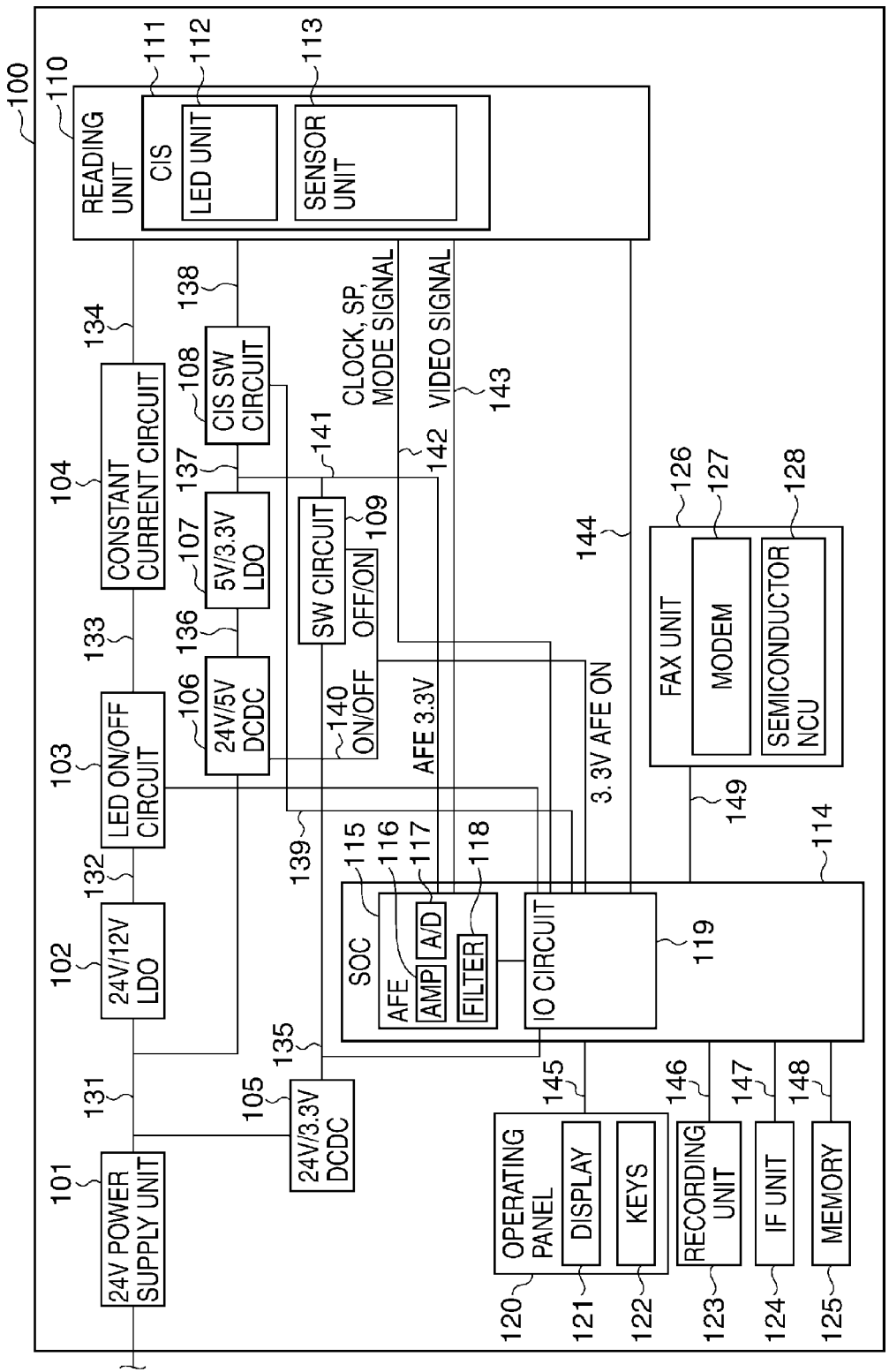
FIG. 1 is a block diagram schematically showing an arrangement of an image forming apparatus according to an embodiment of the present invention.

FIG. 1 is a block diagram schematically showing an arrangement of an image forming apparatus according to an embodiment of the present invention.

Referring to FIG. 1, the image forming apparatus 100 has components described hereafter.

A 24-V power supply unit 101 produces DC 24-V power from an AC commercial power supply (not shown) and supplies the DC power to an integrated circuit and others. A 24-V/12-V_LDO 102 is a low drop-out regulator that converts DC 24-V power to DC 12-V power. An LED_ON/OFF circuit 103 turns on and off power supply to an LED unit 112. A constant current circuit 104 makes electric current for the LED 112 constant.

A 24-V/3.3-V_DC-DC converter 105 is a DC-DC converter for producing DC 3.3-V power from DC 24-V power. A 24-V/5-V_DC-DC converter 106 is a DC-DC converter for producing DC 5-V power from DC 24-V power.

A 5-V/3.3-V_LDO 107 is an LDO type regulator for producing DC 3.3-V power from DC 5-V power. A CIS_SW circuit 108 is a circuit for turning on and off power supply to a CIS (contact image sensor). An SW circuit 109 is a switch circuit for selectively supplying or not supplying 3.3-V power generated by the 24-V/3.3-V_DC-DC converter 105 to an AFE 115 incorporated in an SOC 114.

A reading unit 110 has a CIS 111 and reads an image. The CIS 111 is a contact image sensor that reads an image off an original and has the LED unit 112 and a sensor unit 113. The LED unit 112 is a light-emitting diode, that is, an LED that irradiates an image with light. The sensor unit 113 converts an image read by photoelectric conversion into an output as an electric signal (analog signal).

The SOC 114 is an integrated circuit and a system on chip that controls the overall system. An analog front end (AFE) 115, which converts an analog signal sent from the reading unit 110 into a digital signal, and an in-SOC IO circuit 119 are mounted on the SOC 114. The AFE 115 is a conversion circuit that has an amplifier (AMP) 116 for amplifying an analog signal, an A/D converter (A/D) 117 for conversing an analog signal into a digital signal, and a filter circuit (filter) 118 for removing noise from an analog signal. Power to the in-SOC IO circuit 119 is constantly supplied from the 24-V/3.3-V_DC-DC converter 105, which is a power supply means of a type different from the 5-V/3.3-V_LDO 107.

An operating panel 120 has a display 121 that displays a status of the image forming apparatus 100, and keys 122 that detect instructions from a user.

A recording unit 123 prints an image. An IF unit 124 is an interface that connects to an external device via a USB, a LAN or the like. A memory 125 stores programs for determining operation of the apparatus and accumulates information such as image data.

A FAX unit 126 carries out facsimile communications. A modem 127 is incorporated in the FAX unit 126 and carries out facsimile communications. An NCU (network control unit) 128 is incorporated in the FAX unit 126 and comprised of a semiconductor and provides network control.

A description will now be given of power-supply lines and control signal lines that connect the components described above to one another.

In FIG. 1, reference numeral 131 designates a 24-V power-supply line. Reference numeral 132 designates a 12-V power-supply line. Reference numeral 133 designates a power-supply line that supplies 12-V power to the constant current circuit 104 when the LED_ON/OFF circuit 103 is on. Reference numeral 134 designates a power-supply line that supplies drive current from the constant current circuit 104 to the LED unit 112.

Reference numeral 135 designates a 3.3-V power-supply line generated from the 24-V/3.3-V_DC-DC converter 105. Reference numeral 136 designates a 5-V power-supply line generated from the 24-V/5-V_DC-DC converter 106.

Reference numeral 137 designates a 3.3-V power-supply line generated from the 5-V/3.3-V_LDO 107. Reference numeral 138 designates a power-supply line that supplies 3.3-V power to the reading unit 110 when the CIS_SW circuit 108 is on.

Reference numeral 139 designates a control signal line from the in-SOC IO circuit 119 to the CIS_SW circuit 108. When the CIS_SW circuit 108 is turned on by a control signal from the in-SOC IO circuit 119, power is supplied to the CIS 111 in the reading unit 110, and on the other hand, when the CIS_SW circuit 108 is turned off, supply of power to the CIS 111 is stopped.

Reference numeral 140 designates a control signal line from the in-SOC IO circuit 119 to the SW circuit 109 and the 24-V/5-V_DC-DC converter 106. This control signal switches power to the AFE 115 incorporated in the SOC 114 to 5-V power from the 24-V/5-V_DC-DC converter 106 or 3.3-V power from the 5-V/3.3-V_LDO 107.

Reference numeral 141 designates a 3.3-V power-supply line that is supplied to the AFE 115 incorporated in the SOC 114. Reference numeral 142 designates a control signal line between the CIS 111 and the in-SOC IO circuit 119. Control signals include a control signal output from the in-SOC IO circuit 119 and also include a MODE signal for selecting the resolution of the CIS 111, an SP signal for determining the timing with which reading of images in one line is started, and a CLOCK signal for determining the timing with which a one-dot image is read.

Reference numeral 143 designates a VIDEO signal line that is an analog image output signal from the CIS 111. Reference numeral 144 designates a control signal line or a detection signal line for the reading unit 110.

Reference numeral 145 designates a control signal line to the operating panel 120 or a detection signal line from the operating panel 120. Reference numeral 146 designates a control signal line to the recording unit 123, which prints images or the like, or a detection signal line from the recording unit 123. Reference numeral 147 designates a data signal line to the IF unit 124, which is for exchanging information with external devices via a USB, a wired LAN, and so on. Reference numeral 148 designates a data signal line that connects the memory 125 and the SOC 114 to each other. Reference numeral 149 designates a signal line for carrying out communications with the FAX unit 126.

In sleep mode (energy-saving mode) in which the image forming apparatus 100 shifts into a power-saving state, the SOC 114 shifts into a sleep state by carrying out, for example, a process in which it stops unnecessary operation inside or lowering operation clock speed. The SOC 114 is returned from sleep mode by the in-SOC IO circuit 119 detecting an interrupt signal for return.

Figure 2:
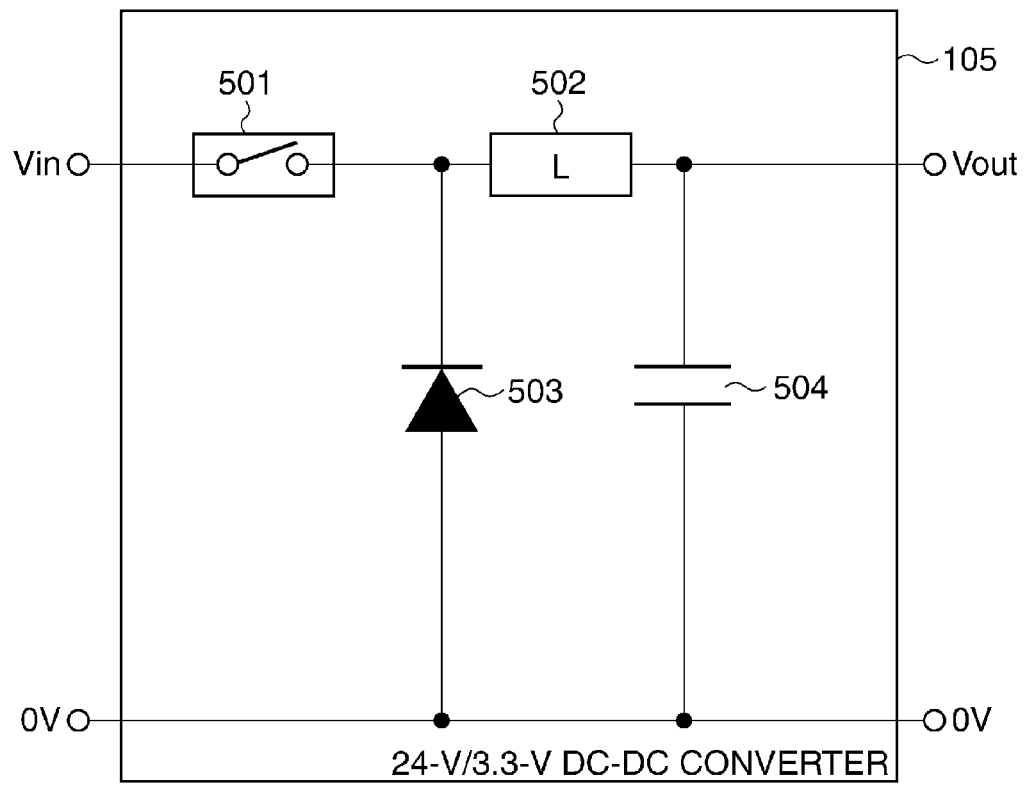
FIG. 2 is a circuit diagram showing an exemplary 24-V/3.3-V_DC-DC converter (asynchronous rectifier type step-down) in FIG. 1.

Accordingly, power is supplied to the in-SOC IO circuit 119 even in sleep mode. By supplying power to the in-SOC IO circuit 119 from the 24-V/3.3-V_DC-DC converter 105 with high power efficiency, power consumption can be kept low. FIG. 2 shows an exemplary circuit diagram of the 24-V/3.3-V_DC-DC converter 105.

FIG. 2 is a circuit diagram showing an example of the 24-V/3.3-V_DC-DC converter 105 in FIG. 2, which an inverter-based asynchronous rectifier type step-down DC-DC converter.

Referring to FIG. 2, the 24-V/3.3-V_DC-DC converter 105 has a switch 501, an inductor 502, a diode 503, and a capacitor 504. Turning on the switch 501 causes the capacitor (C) 504 to be electrically charged via the inductor (L) 502. Turning off the switch 501 causes electric current to be consumed by a load (not shown) connected to the inductor 502 and an output voltage Vout, causing electric charge accumulated in the capacitor 504 to be discharged. The diode 503 is intended to cause only positive voltage to be applied to the capacitor 504.

Figure 3:
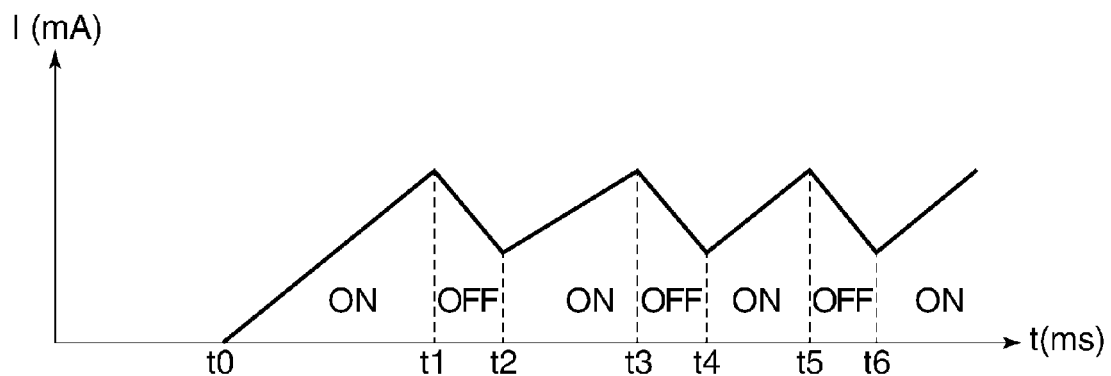
FIG. 3 is a view useful in explaining the value of current flowing through an inductor in FIG. 2.

Only a small part of the 24-V/3.3-V_DC-DC converter 105 shown in the figure consumes power and is thus efficient in terms of power conversion, but on the other hand, electric current changed by switching makes its presence as ripples in the output voltage Vout as shown in FIG. 3.

In FIG. 3, t0, t2, t4, and t6 indicate the timing with which electric current starts passing through the inductor 502. Also, t1, t3, and t5 indicate the timing with which the passage of electric current through the inductor 502 is stopped.

In the 24-V/3.3-V_DC-DC converter 105 in FIG. 2, when the switch 501 is turned on, electric current passing through the inductor 502 increases. Conversely, when the switch 501 is turned off, the inductor 502 tries to pass electric current through it, and hence electric current passing through the inductor 502 decreases. Thus, in the inductance-based DC-DC converter, by changing the switch turning-on/off times, electric current passing through the inductor is controlled to keep the output voltage Vout constant.

Supposing that power from the 24-V/3.3-V_DC-DC converter 105 is supplied to the AFE 115, ripple noise has an effect on the A/D converter 117, the amplifier 116, or the filter circuit 118 and makes its presence as noise in digital values of a read image. Particularly in a case where a low-intensity halftone image is read, this effect is significant.

Figure 4:
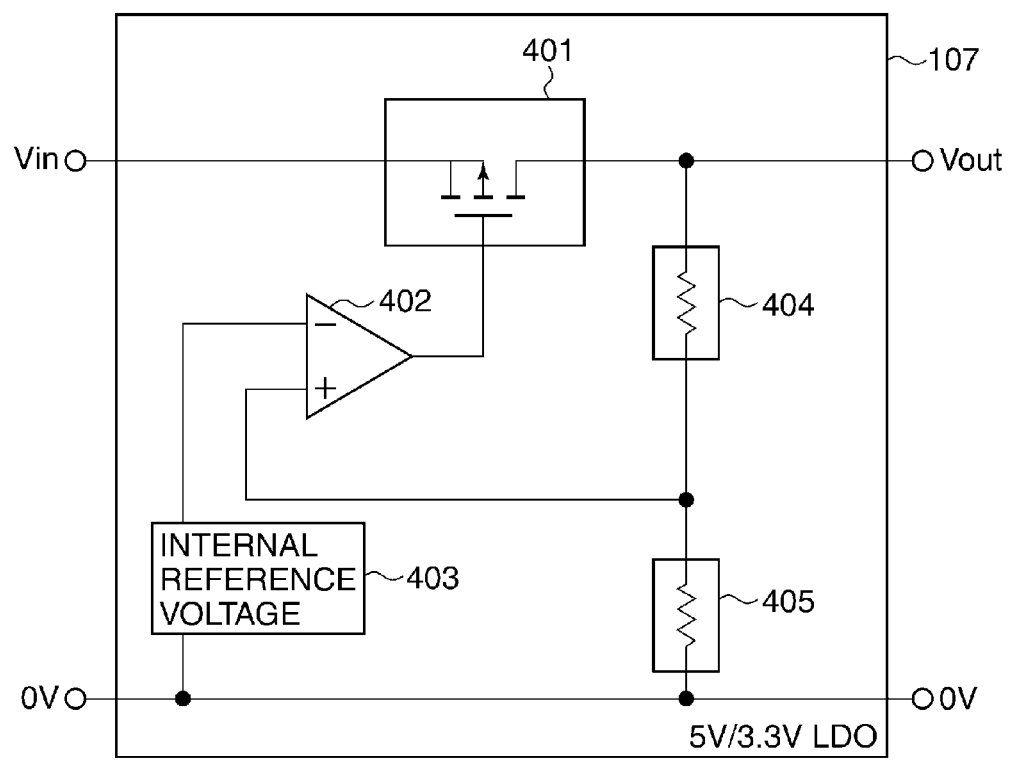
FIG. 4 is a circuit diagram showing a 5-V/3.3-V (Low Drop-Out type regulator with a low power loss) in FIG. 2.

On the other hand, power to the AFE 115 having the amplifier 116, the A/D converter 117, and the filter circuit 118 is on a different line from power to the in-SOC IO circuit 119. Power to the AFE 115 is supplied from the 5-V/3.3-V_LDO 107 which has an arrangement similar to that of a series path regulator. FIG. 4 shows an exemplary circuit diagram of the 5-V/3.3-V_LDO 107.

Referring to FIG. 4, the 5-V/3.3-V_LDO 107 includes a field-effect transistor (FET) 401, an error amplifier 402, an internal reference voltage 403, and resistors 404 and 405. The error amplifier 402 controls the FET 401 so as to keep output voltage Vout constant. The internal reference voltage 403 is compared to a value of voltage divided from the output voltage Vout by the resistors 404 and 405.

In the 5-V/3.3-V_LDO 107, the voltage value of the output voltage Vout is adjusted by causing input voltage Vin to drop using the FET 401. In the 5-V/3.3-V_LDO 107, basically, ripple noise is not likely to make its presence in the output voltage Vout as distinct from a DC-DC converter. However, power is consumed by the FET 401, and hence the power conversion efficiency is lower than that of a DC-DC converter.

Figure 5:
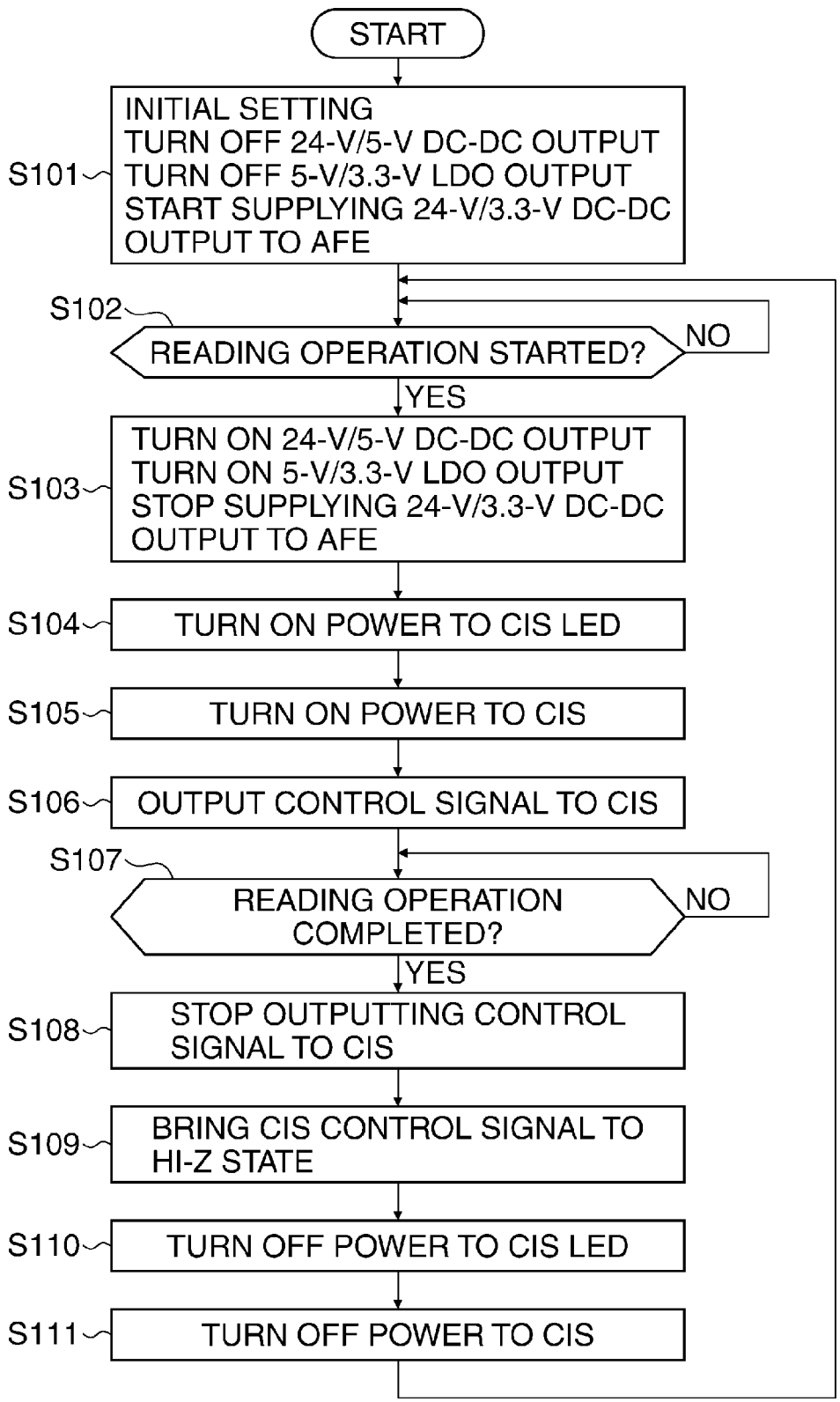
FIG. 5 is a flowchart showing the flow of a power-supply control process during an image reading operation in the image forming apparatus in FIG. 1.

Referring next to FIG. 5, a description will be given of the flow of power-supply control during an image reading operation in the image forming apparatus 100 in FIG. 1.

FIG. 5 is a flowchart showing the flow of a power-supply control process during an image reading operation in the image forming apparatus 100.

Referring to FIG. 5, in step S101, as initial setting, the in-SOC IO circuit 119 sends a control signal so as to turn off output from the 24-V/5-V_DC-DC converter 106, and turns off output from the 5-V/3.3-V_LDO 107. The in-SOC IO circuit 119 then sends a control signal so as to turn on the SW circuit 109 and provides control to supply 3.3-V power from the 24-V/3.3-V_DC-DC converter 105 to the AFE 115.

In step S102, the in-SOC IO circuit 119 determines whether or not an image reading operation by the reading unit 110 has been started. When it is determined that the image reading operation has been started, the process proceeds to step S103.

In the step S103, the in-SOC IO circuit 119 sends a control signal so as to turn on output from the 24-V/5-V_DC-DC converter 106, and turns on output from the 5-V/3.3-V_LDO 107. The in-SOC IO circuit 119 then sends a control signal so as to turn off the SW circuit 109 and stops power supply from the 24-V/3.3-V_DC-DC converter 105 to the AFE 115.

In step S104, the in-SOC IO circuit 119 sends a control signal so as to turn on the LED_ON/OFF circuit 103 and supplies power to the LED unit 112 in the CIS 111 via the power-supply line 133, the constant current circuit 104, and the power-supply line 134.

In step S105, the in-SOC IO circuit 119 sends a control signal so as to turn on the CIS_SW circuit 108, and turns on the CIS 111 via the power-supply line 138. In step S106, the in-SOC IO circuit 119 outputs a control signal to the CIS 111 via the control signal line 142.

In step S107, the in-SOC IO circuit 119 determines whether or not the image reading operation by the reading unit 110 has been completed. When it is determined that the image reading operation has been completed, the process proceeds to step S108.

In the step S108, the in-SOC IO circuit 119 stops outputting the control signal to the CIS 111. In step S109, the in-SOC IO circuit 119 brings power of the control signal to the CIS 111 into a HI-Z state, that is, a high-impedance state.

In step S110, the in-SOC IO circuit 119 sends a control signal so as to turn off the LED_ON/OFF circuit 103, and stops (turns off) power supply to the LED unit 112 in the CIS 111. In step S111, the in-SOC IO circuit 119 sends a control signal so as to turn off the CIS_SW circuit 108, and stops (turns off) power supply to the CIS 111, followed by the process returning to the step S102.

Thus, in the image forming apparatus 100, the SW circuit 109 is used to supply power from the 5-V/3.3-V_LDO 107 when the AFE 115 is in use, so that noise to the AFE 115 can be reduced. On the other hand, when the AFE 115 is not in use during, for example, a non-image forming operation, power is supplied from the 24-V/3.3-V_DC-DC converter 105 to the AFE 115.

On the other hand, during an image reading operation, that is, when the CIS 111 is operating, power is supplied to the CIS 111, which is a reading sensor, from the 5-V/3.3-V_LDO 107 so that noise to the AFE 115 can be reduced, and on the other hand, during a non-image reading operation, that is, when the CIS 111 is not operating, power supply to the CIS 111 is stopped.

Even if an image reading operation is replaced by a sleep operation, the same effects will be obtained. In this case, for example, it is determined in the step S102 in FIG. 5 whether or not a sleep operation has been started. When it is determined that the sleep operation has been started, the in-SOC IO circuit 119 stands by, and on the other hand, when it is determined that the sleep operation has not been started, the processes in the step S103 and the subsequent steps are carried out. Thus, in non-sleep mode, the SW circuit 109 is turned off, and power is supplied to the AFE 115 and the CIS 111 from the 5-V/3.3-V_LDO 107.

Figure 6:
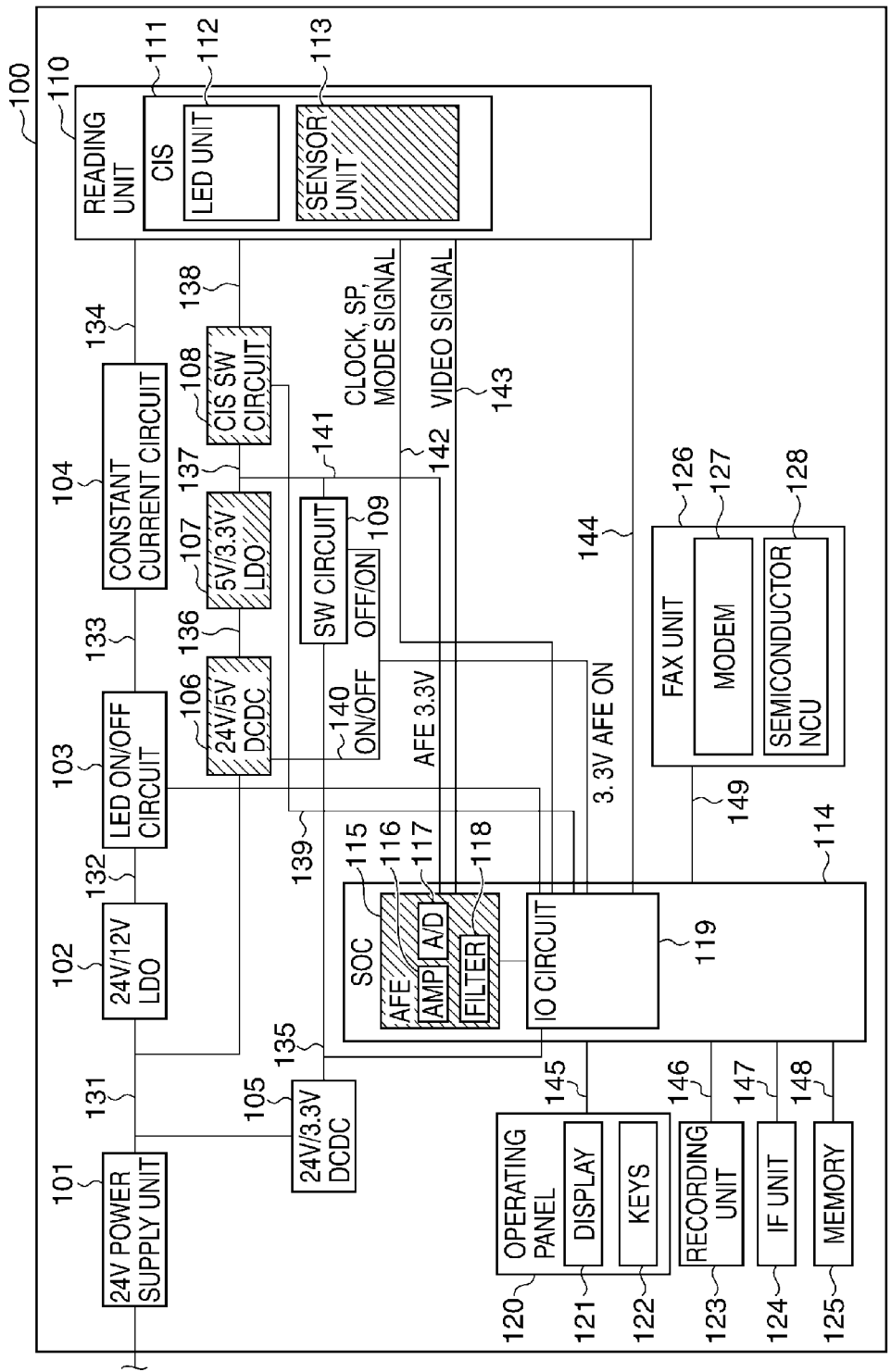
FIG. 6 is a block diagram useful in explaining components to which power is supplied during an image reading operation in the image forming apparatus in FIG. 1.
Figure 7:
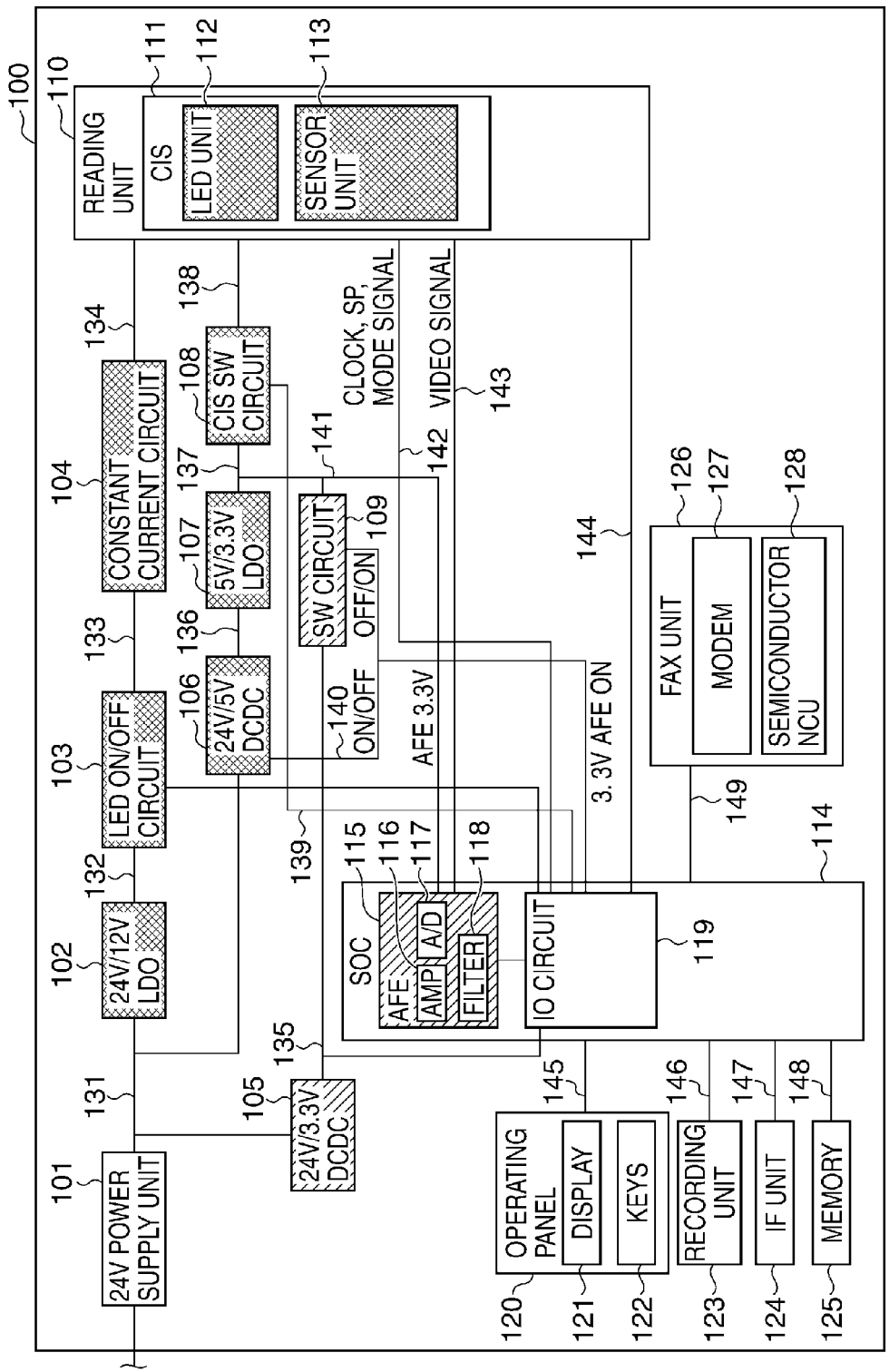
FIG. 7 is a block diagram useful in explaining components to which power is supplied during a non-image reading operation in the image forming apparatus in FIG. 1.

Here, components (areas shaded by lines sloping downward to the left) to which power is supplied during an image reading operation are shown in FIG. 6. On the other hand, components to which power is supplied during a non-image reading operation (areas shaded by lines sloping downward to the right) are shown in FIG. 7. It should be noted that areas shaded by crossing sloped lines represent components that are not in use.

According to the embodiment described above, power is supplied to the AFE 115, which is incorporated in the SOC 114 together with the in-SOC IO circuit 119, from the series path regulator (the 5-V/3.3-V_LDO 107) with low noise when the AFE 115 is in use.

On the other hand, when the AFE 115 is not in use, the source of power is switched to the DC-DC converter (the 24-V/3.3-V_DC-DC converter 105) with high power-supply efficiency. This reduces noise to the AFE 115 and ensures high-quality power supply to the AFE 115 while saving energy by reducing power consumption in a case where the AFE 115 is in use in sleep mode, a non-image reading operation, and so on.

Power to the amplifier 116, the A/D converter 117, and the filter circuit 118 incorporated in the AFE 115 is supplied from the series path regulator (the 5-V/3.3-V_LDO 107) with low noise when they are in use.

On the other hand, when they are not in use, power is switched to power from the DC-DC converter (the 24-V/3.3-V_DC-DC converter 105) with high power-supply efficiency. This ensures high signal quality of the amplifier 116, the A/D converter 117, and the filter circuit 118 while saving energy by reducing power consumption in sleep mode.

As with the amplifier 116, the A/D converter 117, or the filter circuit 118, power to the reading sensor (the CIS 111) is supplied from the series path regulator (the 5-V/3.3-V_LDO 107) with low noise when the CIS 111 is in use, so that high image quality can be ensured.

When the CIS 111 is not in use, power supply to the CIS 111 is turned off to reduce power consumption and save energy. Moreover, since power is not supplied to the CIS 111 from the DC-DC converter (the 24-V/3.3-V_DC-DC converter 105) that supplies power to the amplifier 116, the A/D converter 117, or the filter circuit 118, noise to the DC-DC converter is prevented from becoming radiation noise to outside. Further, noise to the DC-DC converter is prevented from being unwanted noise to a facsimile circuit and an analog public line that lies ahead of it.

In the embodiment described above, the 5-V/3.3-V_LDO 107 is used as the series path regulator, but output voltage drops due to this circuit configuration, and hence an arrangement that lowers voltage by an amount (about 0.1 V) corresponding to the drop may be used.

Figure 8:
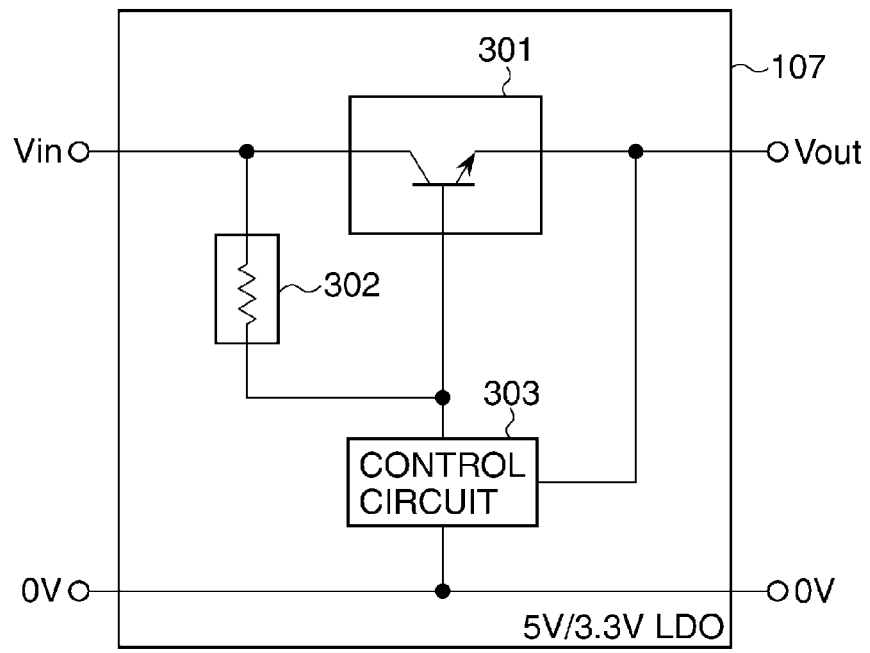
FIG. 8 is a circuit diagram showing another exemplary 5-V/3.3-V_LDO (series path regulator).

As the 5-V/3.3-V_LDO 107, a typical series path regulator using a transistor in FIG. 8 may be used. A circuit in FIG. 8 operates in basically the same manner as the circuit in FIG. 4. Input voltage Vin is stepped down by a transistor 301 to produce output voltage Vout. The transistor 301 operates in basically the same manner as the FET 401. A control circuit 303 controls collector-emitter voltage of the transistor 301. A resistor 302 applies voltage to a base of the transistor 301.

Figure 9:
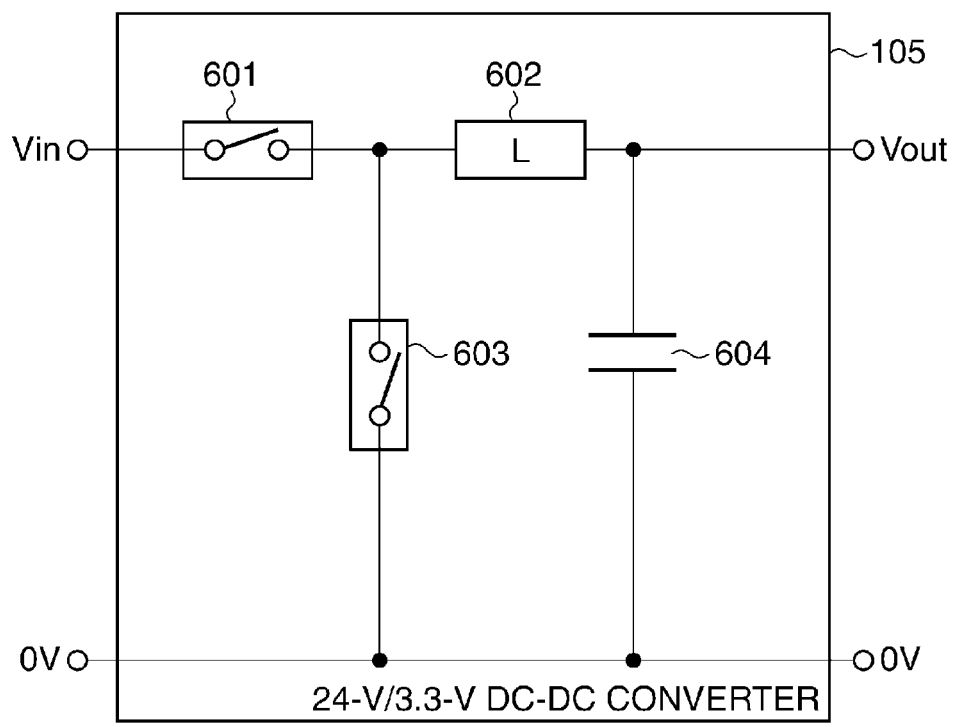
FIG. 9 is a circuit diagram showing another exemplary 24-V/3.3-V_DC-DC converter (synchronous rectifier type step-down).
Figure 10:
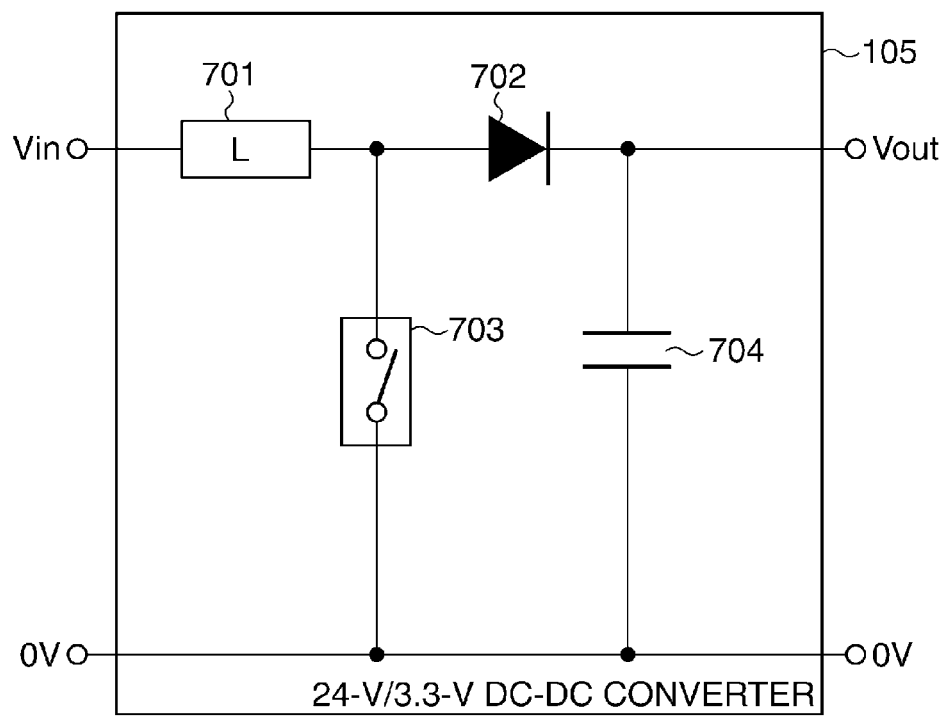
FIG. 10 is a circuit diagram showing another exemplary 24-V/3.3-V_DC-DC converter (synchronous rectifier type step-up).
Figure 11:
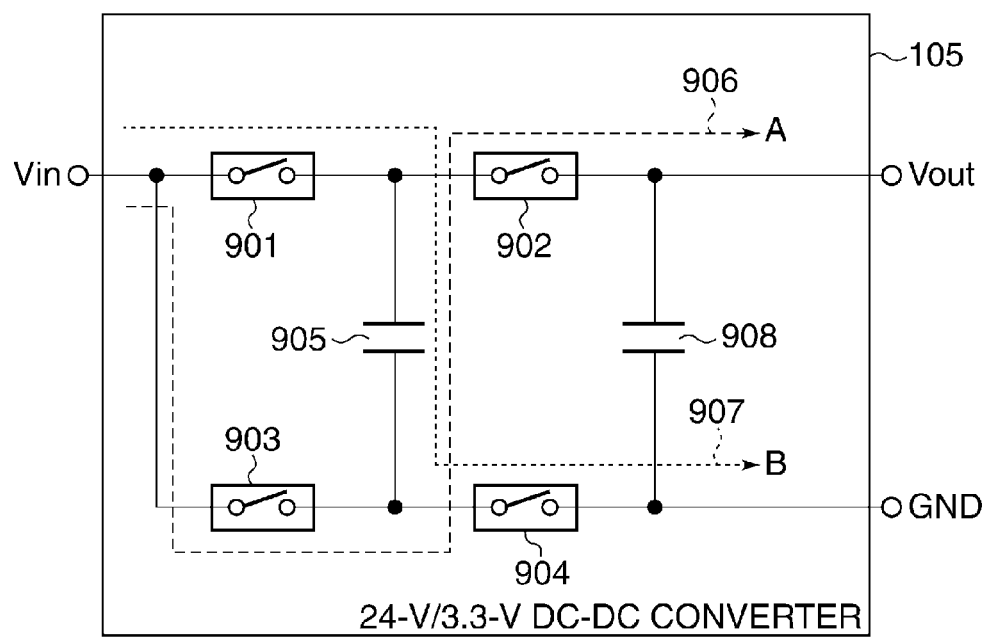
FIG. 11 is a circuit diagram showing another exemplary 24-V/3.3-V_DC-DC converter (charge-pump type).

Further, an inverter-based synchronous rectifier type step-down DC-DC converter in FIG. 9, an inverter-based synchronous rectifier type step-up DC-DC converter in FIG. 10, or a charge-pump type DC-DC converter in FIG. 11 may be used as the 24-V/3.3-V_DC-DC converter 105.

In a circuit in FIG. 9, turning on a switch 601 causes a capacitor 604 to be electrically charged via an inductor 602. On the other hand, turning off the switch 601 causes power to be consumed by the inductor 602 and a load connected to output voltage Vout and causes electric charge accumulated in the capacitor 604 to be discharged. A switch 603 is on when the switch 601 is off.

In the circuit in FIG. 9, even when the switch 601 is turned off, the inductor 602 tries to pass electric current through it. Thus, to prevent the output voltage Vout from rising, the switch 603 is turned off to lower the output voltage Vout. As a result, the output voltage Vout rises when the switch 601 is turned on, and on the other hand, the output voltage Vout drops when the switch 603 is turned on (the switch 601 is turned off).

In a circuit shown in FIG. 10, when a switch 703 is turned on, input voltage Vin is supplied to an inductor 701. On the other hand, when the switch 703 is turned off, the inductor 701 tries to continue passing electric current through it and supplies electric current toward a diode 702. This electrically charges a capacitor 704.

In a circuit shown in FIG. 11, electric current is passed through B907 by turning on a switch 901 and a switch 904 and turning off a switch 903 and a switch 902. At this time, electric charge is accumulated in a capacitor 905. On the other hand, electric current is passed through A906 by turning off the switch 901 and the switch 904 and turning on the switch 903 and the switch 902. The electric current passing through B907 causes the capacitor 905 to be charged with input voltage Vin. Thus, a voltage twice as high as the input voltage Vin is output as output voltage Vout.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-267299, filed Dec. 25, 2013, which is hereby incorporated by reference herein in its entirety.

What is claimed is:

1. An image forming apparatus comprising:
 a conversion circuit configured to convert an analog signal into a digital signal;
 a first power supply configured to supply first DC power to said conversion circuit; and
 a second power supply configured to supply second DC power to said conversion circuit using a method different from a method used by said first power supply;
 an integrated circuit in which said conversion circuit and other circuits different from said conversion circuit are incorporated;
 a switching circuit configured to switch power to said conversion circuit between the first DC power and the second DC power; and
 a control unit configured to, when said conversion circuit is in use, control said switching circuit such that the first DC power is supplied from said first power supply to said conversion circuit, and when said conversion circuit is not in use, control said switching circuit such that the second DC power is supplied from said second power supply to said conversion circuit.

2. The image forming apparatus according to claim 1, further comprising:
 an image reading unit configured to read an image off an original; and
 a switch circuit for supplying the second DC power from said second power supply to said image reading unit, wherein when said image reading unit is in use, said control unit controls said switching circuit such that power is supplied from said first power supply to said conversion circuit, and the first DC power is supplied from said first power supply to said image reading unit, and when said image reading unit is not in use, said control unit controls said switching circuit such that the second DC power is supplied from said second power supply to said conversion circuit.

3. The image forming apparatus according to claim 1, wherein
 the image forming apparatus has a mode in which the image forming apparatus shifts into a power-saving state, and
 wherein in a case where the image forming apparatus has shifted into the mode, said control unit controls said switching circuit such that the second DC power is supplied from said second power supply to said conversion circuit, and in a case where the image forming apparatus has not shifted into the mode, said control unit controls said switching circuit such that the first DC power is supplied from said first power supply to said conversion circuit.

4. The image forming apparatus according to claim 1, wherein said conversion circuit includes an A/D converter that converts an analog signal into a digital signal, an amplifier that amplifies an analog signal, and a filter circuit that removes noise from an analog signal.

5. The image forming apparatus according to claim 1, wherein said first power supply includes an LDO type regulator and a series path type regulator, and
 said second power supply includes a asynchronous rectifier type step-down DC-DC converter, a synchronous rectifier type step-down DC-DC converter, a synchronous rectifier type step-up DC-DC converter, and a charge-pump type DC-DC converter.

6. The image forming apparatus according to claim 1, output voltage of the first DC power supplied from said first power supply is increased.

* * * * *